(12) United States Patent
Nakata

(10) Patent No.: US 7,289,450 B2
(45) Date of Patent: Oct. 30, 2007

(54) FLOOD SIGNALING ARCHITECTURE AND PROCESS FOR PROVISIONING COMMUNICATION PATHS

(75) Inventor: Tsuneo Nakata, Hoboken, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1026 days.

(21) Appl. No.: 10/179,043

(22) Filed: Jun. 25, 2002

(65) Prior Publication Data

US 2003/0235154 A1    Dec. 25, 2003

(51) Int. Cl.
  *H04J 3/14*   (2006.01)
  *H04L 12/40*  (2006.01)

(52) U.S. Cl. ..................... 370/248; 370/351

(58) Field of Classification Search ............... 370/351, 370/390, 400, 216, 217, 225, 227, 228, 248, 370/468
See application file for complete search history.

(56) References Cited

U.S. PATENT DOCUMENTS

| | | | |
|---|---|---|---|
| 6,167,025 A * | 12/2000 | Hsing et al. ............. | 370/216 |
| 6,483,833 B1 * | 11/2002 | Jagannath et al. ....... | 370/392 |
| 6,538,991 B1 * | 3/2003 | Kodialam et al. ....... | 370/229 |
| 6,820,134 B1 * | 11/2004 | Zinin et al. ............. | 709/238 |
| 6,842,723 B2 * | 1/2005 | Alicherry et al. ....... | 703/2 |
| 6,917,596 B1 * | 7/2005 | Wight et al. ............ | 370/254 |
| 6,917,985 B2 * | 7/2005 | Madruga et al. ........ | 709/238 |
| 7,043,250 B1 * | 5/2006 | DeMartino ............. | 455/445 |
| 2002/0141345 A1 * | 10/2002 | Szviatovszki et al. ... | 370/238 |
| 2002/0150099 A1 * | 10/2002 | Pung et al. ............. | 370/390 |
| 2003/0018812 A1 * | 1/2003 | Lakshminarayana et al. ................... | 709/241 |
| 2003/0095500 A1 * | 5/2003 | Cao ....................... | 370/216 |
| 2006/0153066 A1 * | 7/2006 | Saleh et al. ............. | 370/216 |

* cited by examiner

*Primary Examiner*—Min Jung

(57) ABSTRACT

A method for establishing a communications path between a source node and destination node. The method includes defining a first group of network elements (NEs) suitable for use in the communications path, contemporaneously determining available resources within each of the NEs of the first group of NEs, and contemporaneously reserving those available resources appropriate to establish the communications path. The reserved resources sufficient to establish the communications path are selected, while those reserved resources not selected are released. In the absence of available resources sufficient to establish the communications path, the method is repeated using a second group of NEs suitable for establishing the communications path.

21 Claims, 13 Drawing Sheets

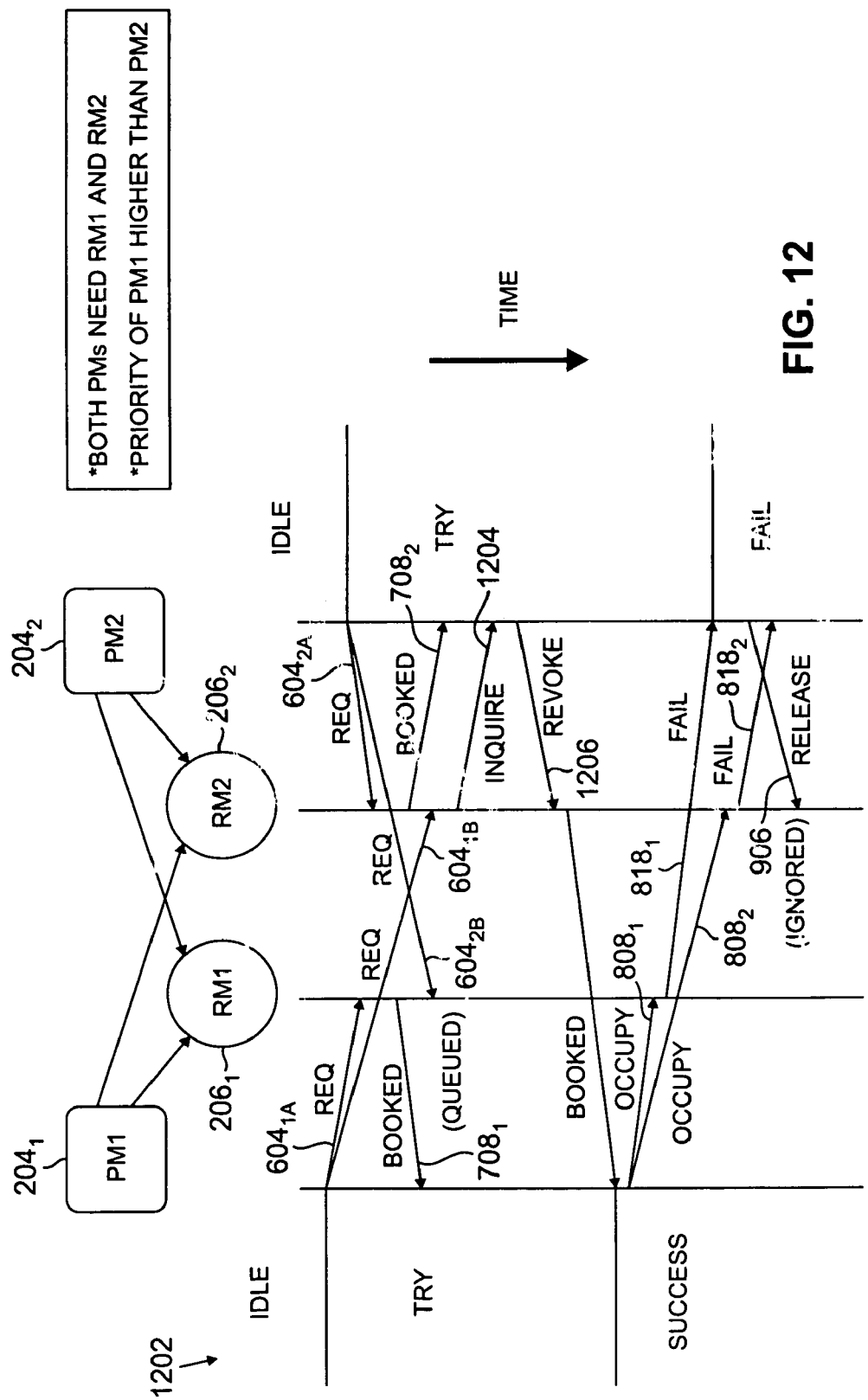

FLOOD SIGNALING ARCHITECTURE AND PROCESS FOR PROVISIONING COMMUNICATION PATHS

FIELD OF INVENTION

The present invention relates to data networks. More specifically, the invention relates to provisioning communication paths in the data networks.

BACKGROUND OF INVENTION

Typical network management systems provide a primary path between a source node and a destination node, as well as a backup path in case the primary path fails. Earlier network management techniques included dedicating specific resources for the backup path. However, providing specific dedicated resources is considered wasteful of such resources. In particular, the dedicated resources and respective bandwidth is unused during normal operation, and is only used in the case of a failure event.

Current network management techniques include sharing of the resources between the primary and backup paths. In this case, the shared resources are planned such that any single link failure does not result in any contention between demands that require restoration resources (e.g., nodes, such as routers and switches) during an expected failure event.

However, it is virtually impossible for the resources to be prepared for unexpected multiple failures. For example, unexpected failure events, such as a natural disaster or terrorist attack, which may sever multiple shared primary and backup paths. Accordingly, the network manager is limited in its ability to provide communication restoration paths during unplanned failure events.

SUMMARY OF THE INVENTION

The disadvantages heretofore associated with the prior art, are overcome by the present invention of a method for establishing a communications path between a source node and destination node. The method includes defining a first group of network elements (NEs) suitable for use in the communications path, contemporaneously determining available resources within each of the NEs of the first group of NEs, and contemporaneously reserving those available resources appropriate to establish the communications path.

The reserved resources sufficient to establish the communications path are selected, while those reserved resources not selected are released. In the absence of available resources sufficient to establish the communications path, the method is repeated using a second group of NEs suitable for establishing the communications path.

BRIEF DESCRIPTION OF THE DRAWINGS

The teachings of the present invention can be readily understood by considering the following detailed description in conjunction with the accompanying drawings, in which:

FIG. 12 depicts a flow diagram illustrating resource conflict resolution between a plurality of network managers.

To facilitate understanding, identical reference numerals have been used, where possible, to designate identical elements that are common to the figures.

DETAILED DESCRIPTION OF THE INVENTION

The invention relates to multicasting signals from a source node to a plurality of nodes including a destination node to reserve (i.e., "book") a communications through-path from the source node to the destination node. As will be discussed herein, network and nodal managing software is capable of provisioning communication paths in data networks. To establish a communication path from a source node to a destination node, certain network elements must be reserved along the path to ensure resources are available to setup a new communication channel.

The present invention provides distributed (multicast) signaling that requests availability messages from multiple resources between source and destination nodes. The multicasting (i.e., flooding) of resource availability messages provides parallel path search and resource reservation in case restoration attempts using pre-assigned backup paths fail. The multicasting of resource availability messages is especially useful during unexpected failure events that cause severe network failure and uncertain network topology.

Figure 1:
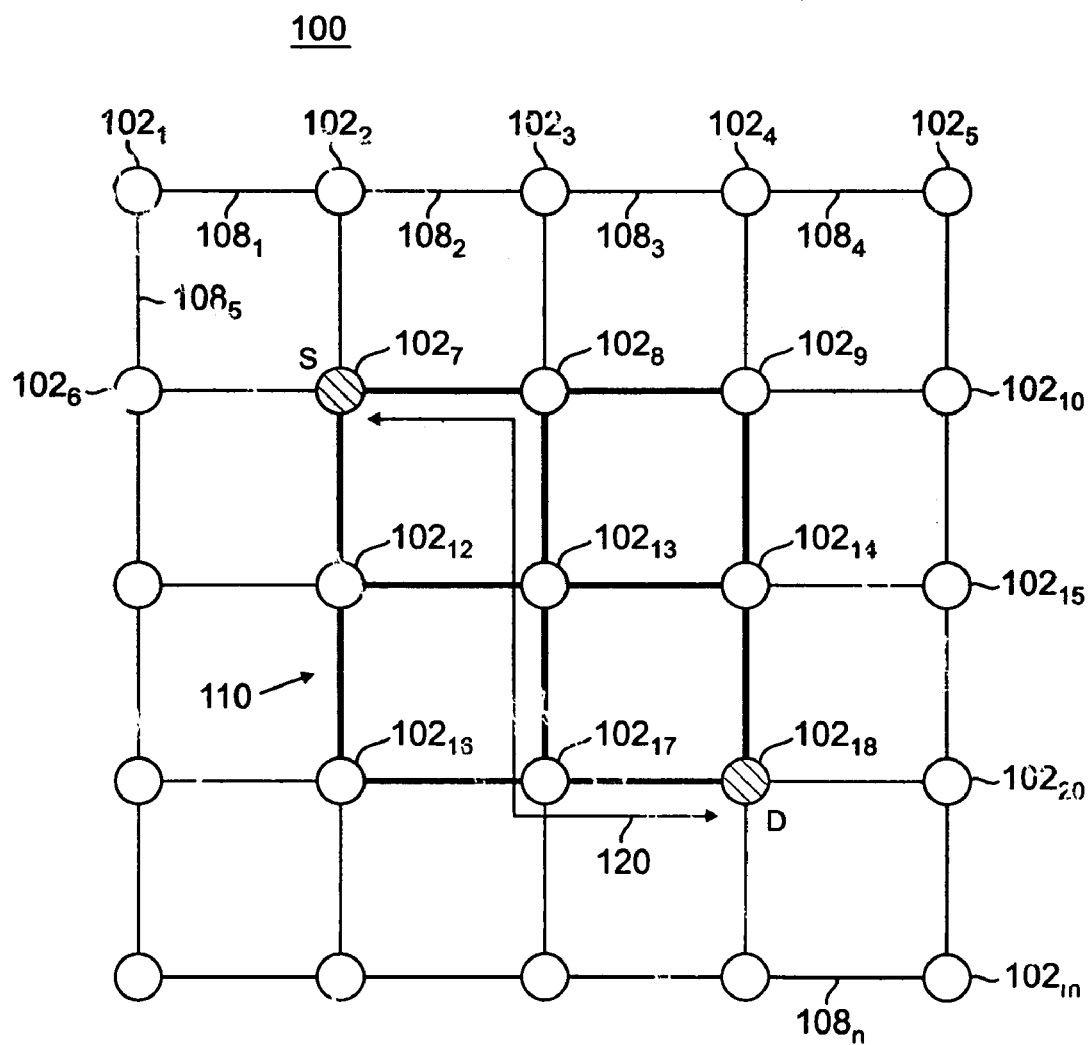
FIG. 1 depicts an exemplary schematic view of a network having a plurality of nodes and a plurality of interconnecting paths defined therebetween.

FIG. 1 depicts an exemplary schematic view of a network 100 having a plurality of nodes 102 and a plurality of interconnecting paths 108 defined therebetween. The present embodiment of the invention is discussed in terms of an optical communications network 100, however, those skilled in the art will appreciate that the network 100 may be any type of data communications network having a plurality of nodes 102 and interconnecting paths 108 therebetween. Moreover, while the network is shown as a symmetrical grouping of nodes, an actual network will likely not conform to such slope.

In particular, FIG. 1 depicts a plurality of nodes $102_1$ through $102_m$ (collectively nodes 102) where m is an integer greater than one. Each node 102 is interconnected to other nodes by one or more communication paths $108_1$ through $108_n$ (collectively paths 108) where n is an integer greater than one. The plurality of nodes 102 and paths 108 together define the communications network 100 (i.e., array of nodes 102). Each node 102 represents a point of connection in the network 100 (e.g., router or switch) and facilitates the transfer of data to other nodes 102 via one or more paths 108.

For purposes of better understanding the invention, the network 100 shown in FIG. 1 illustratively comprises 25 nodes 102, where each node has two to four interconnecting paths 108 to other nodes 102. For example, the first node $102_1$ comprises two interconnecting paths 108 including a first path $108_1$ to the second node $102_2$ and a second path $108_5$ to a sixth node $102_6$. One skilled in the art will appreciate that the number of nodes 102, as well as the number of interconnecting paths 108 between the nodes 102 is network specific. For example, an interconnecting path (not shown) may be provided between the first node $102_1$ and the seventh node $102_7$.

Figure 2:
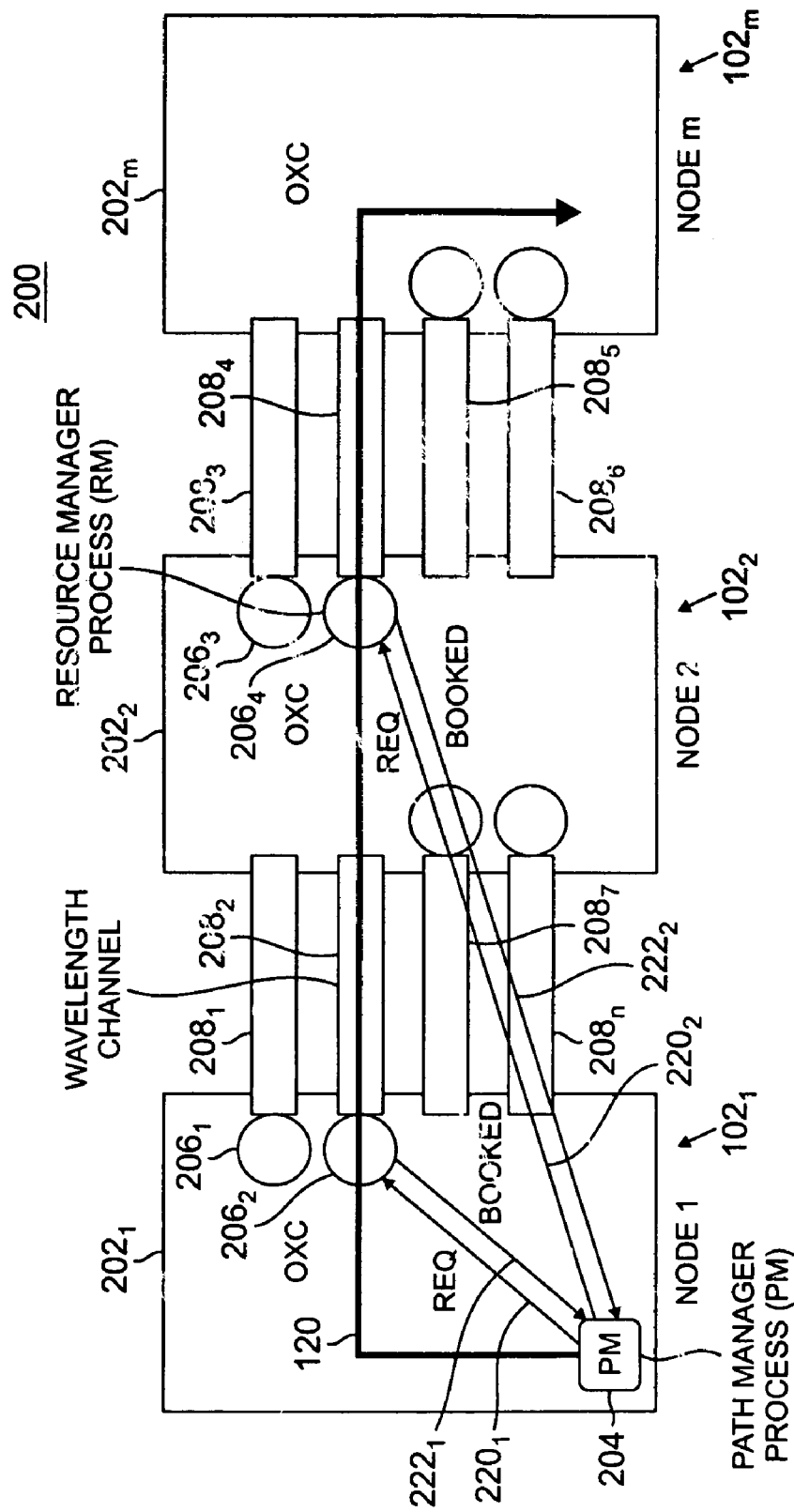
FIG. 2 depicts a block diagram of a communication path between a portion of the plurality of nodes of FIG. 1.

FIG. 2 depicts a block diagram of a communication path 200 between a portion of the plurality of nodes of FIG. 1. In particular, three exemplary optical communication nodes 102 are shown, where the first node $102_1$ is a source node and the third node $102_3$ is a destination node.

Each node operating as a source node, such as $102_1$, comprises a path manager (PM) 204 for initiating and multicasting signals from the source node to the destination node, as well as interconnecting nodes therebetween. The PM 204 is located at source nodes where demands are initiated for the allocation of resources. Where multiple source nodes exist in a network 100, the path managers 204 are assigned a unique priority to avoid conflicts of resources, as discussed in further detail below. Each node 102 further comprises at least one resource manager 106 for receiving the demands from the PM 204 and allocating the node's resources in response to the demand.

Each node 102 is coupled to at least one other node via one or more communication paths supported by, illustratively, optical fibers. The optical fibers are physically interconnected at each node 102 by an optical cross-connect (OXC) 202, which allows the optical signals to be directed and redirected from any of a plurality of fibers to any of a number of output fibers, without manual switching. Each optical fiber is capable of simultaneously carrying one or more optical signals having differing wavelengths, for example, by using wave division multiplexing (WDM) techniques known in the art. As such, each optical fiber forms a wavelength channel 208. In an optical network 100, a particular router or switch may have 50 optical fibers. The number of channels 208 defines the signal capacity "C" at each link 108. That is, the number of communication channels multiplexed on a link. FIG. 2 is a special example where each link equals a channel, but in general, a link, such as a single fiber, contains multiple channels (wavelengths or time slots).

Two exemplary forward wavelength channels $208_1$ and $208_2$ are coupled from the first node $102_1$ to the second node $102_2$, and two forward wavelength channels $208_3$ and $208_4$ are coupled from the second node $102_2$ to the third node $102_3$. Similarly, two exemplary reverse wavelength channels $208_5$ and $208_6$ are coupled from the third node $102_3$ to the second node $102_2$, and two reverse wavelength channels $208_7$ and $208_n$ (where n in FIG. 2 illustratively equals 8) are coupled from the second node $102_2$ to the first node $102_1$.

Further, each wavelength channel 208 is associated with the resource manager (RM) 206. The RM 206 administrates the reserving ("booking") of its associated node resources to the PM 204. In particular, the first node 102, (i.e., source node) comprises a first and second RM 206, and $206_2$ associated with the forward wavelength channels $208_1$ and $208_2$. The second node $102_2$ comprises a third and fourth RM $206_3$ and $206_4$ associated with the forward wavelength channels $208_3$ and $208_4$. The third node $102_3$ (i.e., destination node) comprises a fifth and sixth RM $206_5$ and $206_6$ associated with the reverse wavelength channels $208_5$ and $208_6$, while the second node $102_2$ further comprises a seventh and eighth RM $206_7$ and $206_8$ associated with the reverse wavelength channels $208_7$ and $208_8$.

The path manager 204 at the source node $102_1$ communicates with the resource managers 206 at the source and destination nodes $102_1$ and $102_3$, as well as the resource managers 206 at possible interconnecting nodes between the source and destination nodes, for example, the resource manager $206_4$ at the second node $102_2$. In particular, the path manager defines a "flooding" scope 110 to establish sufficient resources among a plurality of nodes 102.

Referring to FIG. 1, twenty-five exemplary nodes are shown including a source node $102_7$ designated "S", and a destination node $102_{18}$ designated "D". Communications between the exemplary source and destination nodes $102_7$ and $102_{18}$ may only be realized by establishing a through-path therebetween. Establishing a through-path requires allocating the necessary resources at one or more nodes that, when linked together, form the through-path. For example, a through-path represented by the arrow 120 is shown from the source node $102_7$ to the destination node $102_{18}$ through interconnecting nodes $102_8$, $102_{13}$, and $102_{17}$. In this example, the interconnecting nodes $102_8$, $102_{13}$, and $102_{17}$ have allocated their respective resources (bandwidth) to provide a communications through-path from the source node S to the destination node D.

One feature of the embodiment is that the exemplary source node $102_7$ multicasts resource allocation requests to a defined number of the plurality of nodes 102 to achieve a through path 120. That is, the path manager 204 multicasts request signals to the destination node $102_{18}$, as well as one or more possible interconnecting nodes (i.e., a group of interconnecting nodes).

In the example shown in FIG. 1, the dark shaded lines represent the scope of flooding request signals to a defined number (i.e., subset) of nodes of the plurality of nodes 120. In this instance, seven nodes are defined in the set of interconnecting nodes between the source and destination nodes. The scope of flooding (i.e., flooding scope 110) may change or remain the same for each communication session between a particular source node and destination node.

It is noted that the set interconnecting nodes must have some relationship to establishing a through-path to the destination node $102_{18}$. For example, a request would not be sent to node $102_2$ in conjunction with the group of interconnecting nodes shown in FIG. 1, since node $102_2$ will not establish a through-path 120 to the destination node $102_{18}$ simply by itself. However, if nodes $102_2$ and $102_3$ were both included in the scope of flooding, then a through-path 120 may illustratively be established from the source node $102_7$, through nodes $102_2$, $102_3$, $102_8$, $102_9$, and $102_{14}$, to the destination node $102_{18}$.

It is further noted that a multi-stage flood list having "P" stages may be generated. Each stage may comprise some, all, or none of the nodes 102 of another stage. Where all of the nodes of one stage are included in a second stage, then additional nodes will be added to the flooding scope stage. Referring to FIG. 1, a second flooding scope may include nodes $102_4$, $102_5$, $102_{10}$, and $102_{15}$, in addition to the above-mentioned nodes. The multiple stages provide additional or backup resources for forming paths to rout information.

The path manager 204 generally communicates with particular resource managers 206 to establish a communications through-path 120 between the source S and destination D nodes. In particular, the PM 204 sends a provisioning request 220 to particular resource managers 206. If the requested resource is available, the resource managers 206 replies back to the PM 204 with a "booked" message 222. When the path manager 204 receives booked messages 222 from a set of resource managers 206 that constitutes a through-path 120, the signaling process is completed and the network 100 can continue with path setup processing. At this time, the PM 204 sends "occupy" messages to the resource managers 206 in the set and "release" messages to the other resource managers 206 in the flooding scope, as discussed in further detail below. The multicasting of request messages 220 provides faster completion of signaling in cases without collisions among requests, and greater probability of success in cases with the collisions, than by a hop-by-hop signaling architecture.

Figure 3:
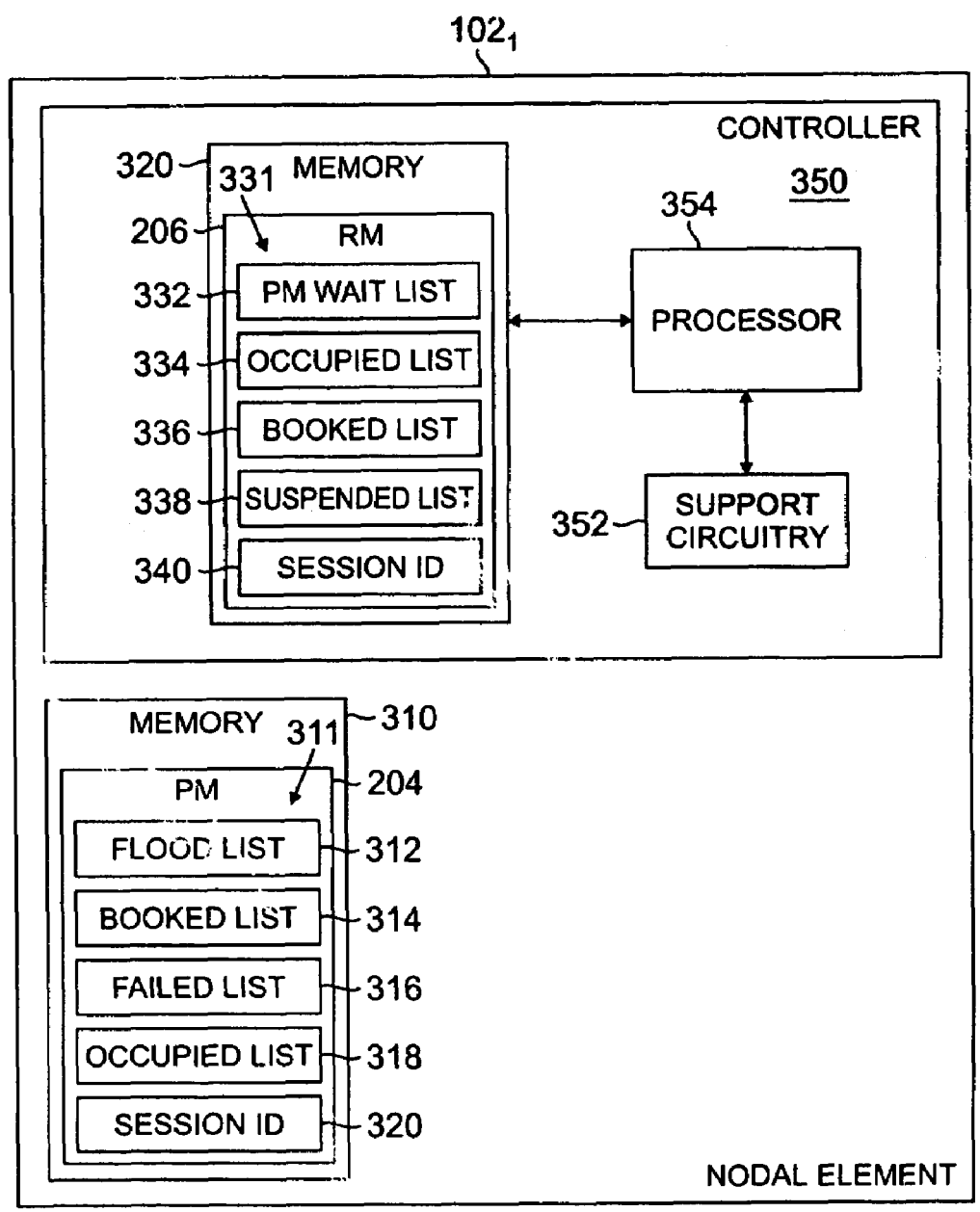
FIG. 3 depicts a detailed block diagram of a node of FIG. 2.

FIG. 3 depicts a detailed block diagram of a controller portion of a node 102 of FIG. 2. In particular, an illustrative source node 102, comprises a controller 350 suitable for use in the nodal element 102 of FIG. 1. Specifically, the controller 350 of FIG. 3 comprises a processor 354 as well the memory 330 for storing various control programs such as the resource manager 206. The processor 354 cooperates with conventional support circuitry 352 such as power supplies, clock circuits, cache memory, I/O circuitry, and the like as well as circuits that assist in executing the software routines stored in the memory 330. As such, it is contemplated that some of the process steps discussed herein as software processes may be implemented within hardware, for example as circuitry that cooperates with the processor 354 to perform various steps.

Although the controller 350 of FIG. 3 is depicted as a general purpose computer that is programmed to perform various control functions in accordance with the present invention, the invention can be implemented in hardware as, for example, an application specific integrated circuit (ASIC). As such, the processing steps described herein are intended to be broadly interpreted as being equivalently performed by software, hardware, or a combination thereof.

Furthermore, the controller 350 is illustratively depicted as controlling the resource manager 206. However, it is contemplated that the same controller 350 or an additional controller (not shown) is utilized to control the path managers 204 in the source nodes, as well.

The path manager 204 is stored in memory (e.g., RAM) 310, which is coupled to a controller as generally discussed above with regard to the resource manager 206. The path manager 204 maintains a plurality of RM status lists 311. The RM status lists 311 comprise a flood list 312, a booked list 314, a failed list 316, an occupied list 318, and a session ID 220.

The flood list 312 stores an array of resource managers 206 within the flooding scope (i.e., those resource managers selected to receive a provisioning request). The booked list 314 stores a subset of the resource managers 206 of the flood list 312 that reply to the PM 204 with a booked message 220. The failed list 316 stores a subset of the resource managers 206 of the flood list 312 that reply to the PM 204 with a failed message. The occupied list 318 stores a subset of the resource managers 206 of the flood list 312 that reply to the PM 204 with an occupied message.

The session ID is a unique number assigned for each session requested by the PM 204. In particular, a session is defined as the generation of the flood list at the source node S comprising the set of resource managers to establish a through-path 120 to a destination node D.

Similarly, each resource manager 206 comprises memory (e.g., RAM) 330 for maintaining a plurality of PM status lists 331. The PM status lists 311 comprise a PM wait list 332, an occupied list 334, a booked list 336, a suspended list 338, and a session ID 240.

The PM wait list 332 stores a list of PM's that have initiated request messages and are waiting to utilize the resource manager. That is, a particular resource may be requested by multiple PM's 204. The PM's are prioritized and the lesser priority PM's 204 are stored in the PM wait list 332. The occupied list 334, booked list 334, and suspended list 338 store the latest status of the resource by the resource manager 206. For example, if the RM 206 replies with a booked message 222, then the booked list 336 is updated. If the RM 206 subsequently sends an occupied message, then the occupied list 334 is updated and the entry in the booked list 336 is deleted. It is noted each reply message (i.e., booked, failed, occupied) carries the session ID originating from the PM 204.

Figure 4:
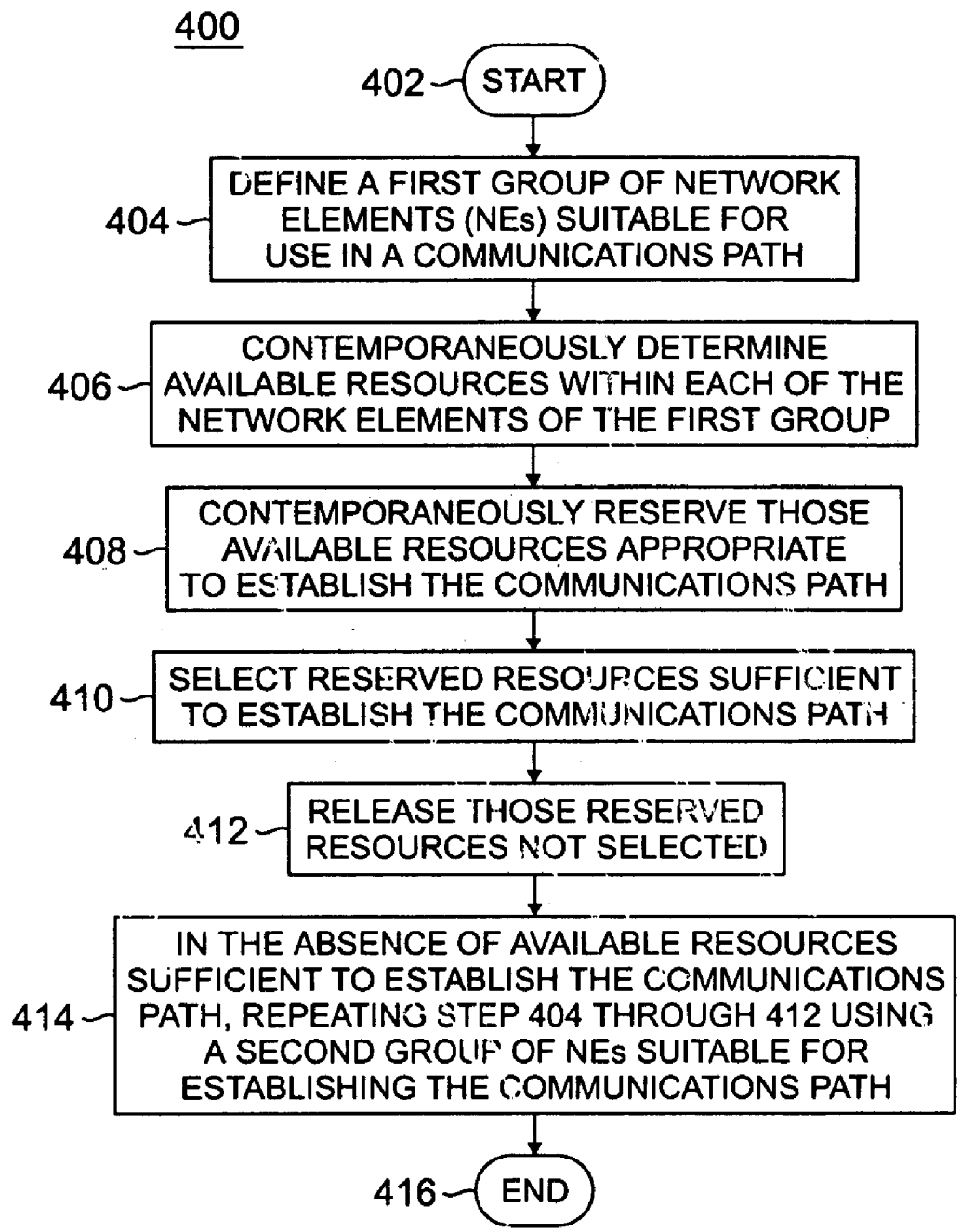
FIG. 4 depicts a flowchart of a method for establishing a communications path in the network of FIG. 1.

FIG. 4 depicts a flowchart of a first method 400 for establishing a communications path 120 in the network 100 of FIG. 1. The method 400 starts at step 402 and proceeds to step 404, where a first group (i.e., first flooding scope) of network elements (i.e., nodes) are defined for use in the communications path. As shown with regard to FIG. 1, multiple nodes may be defined in the first flooding scope.

At step 406, the path manager (PM) 204 at the source node, which initiates the communications path 120 to the destination node, contemporaneously sends request messages to each of the resource managers (RMs) 206 in the flooding scope. At step 408, the RM's 206 at the resources respond to the request messages. That is, the nodes in the first flooding scope having available resources (i.e., bandwidth) return a reservation message (i.e., "booked" message) back to the PM 204.

At step 410, the PM selects sufficient reserved resources to establish the communication path. Referring to FIG. 1, the exemplary flood scope includes nodes $102_7$, $102_8$, $102_9$, $102_{12}$, $102_{13}$, $102_{14}$, $102_{16}$, $102_{17}$, and $102_{18}$. If, for example, nodes $102_8$, $102_{12}$, $102_{13}$, $102_{16}$, and $102_{17}$ return booked messages, then four possible through-paths 120 may be selected by the PM 204 at the source node $102_7$. A first possible through-path $120_1$ includes nodes $102_8$, $102_{13}$, and $102_{17}$. A second possible through-path $120_2$ includes nodes $102_8$, $102_{13}$, $102_{12}$, $102_{16}$, and $102_{17}$. A third possible through-path $120_3$ includes nodes $102_{12}$, $102_{16}$, and $102_{17}$. The fourth possible through-path $120_4$ includes nodes $102_{12}$, $102_{13}$, and $102_{17}$.

Once the reserved resources to provide through-path 120 are selected, then at step 412, the non-selected reserved resources are released. That is, the PM at the source node (e.g., source node $102_7$) sends a release message to the non-selected nodes. For example, if in step 410, the first possible through-path $120_1$ including nodes $102_8$, $102_{13}$, and $102_{17}$ are selected, then a release message is sent to nodes $102_{12}$ and $102_{16}$.

At step 414, in the absence of available resources in the first flooding scope $110_1$ to establish the communications path 120, steps 404 through 412 are repeated for a second group of network elements (nodes). That is, a second flooding scope $110_2$ is defined to establish the communications through-path between the source and destination nodes (e.g., nodes $102_7$ and $102_{18}$). It is noted that step 414 may cause steps 404-412 to be repeated for additional groups of nodes as well.

Figure 5:
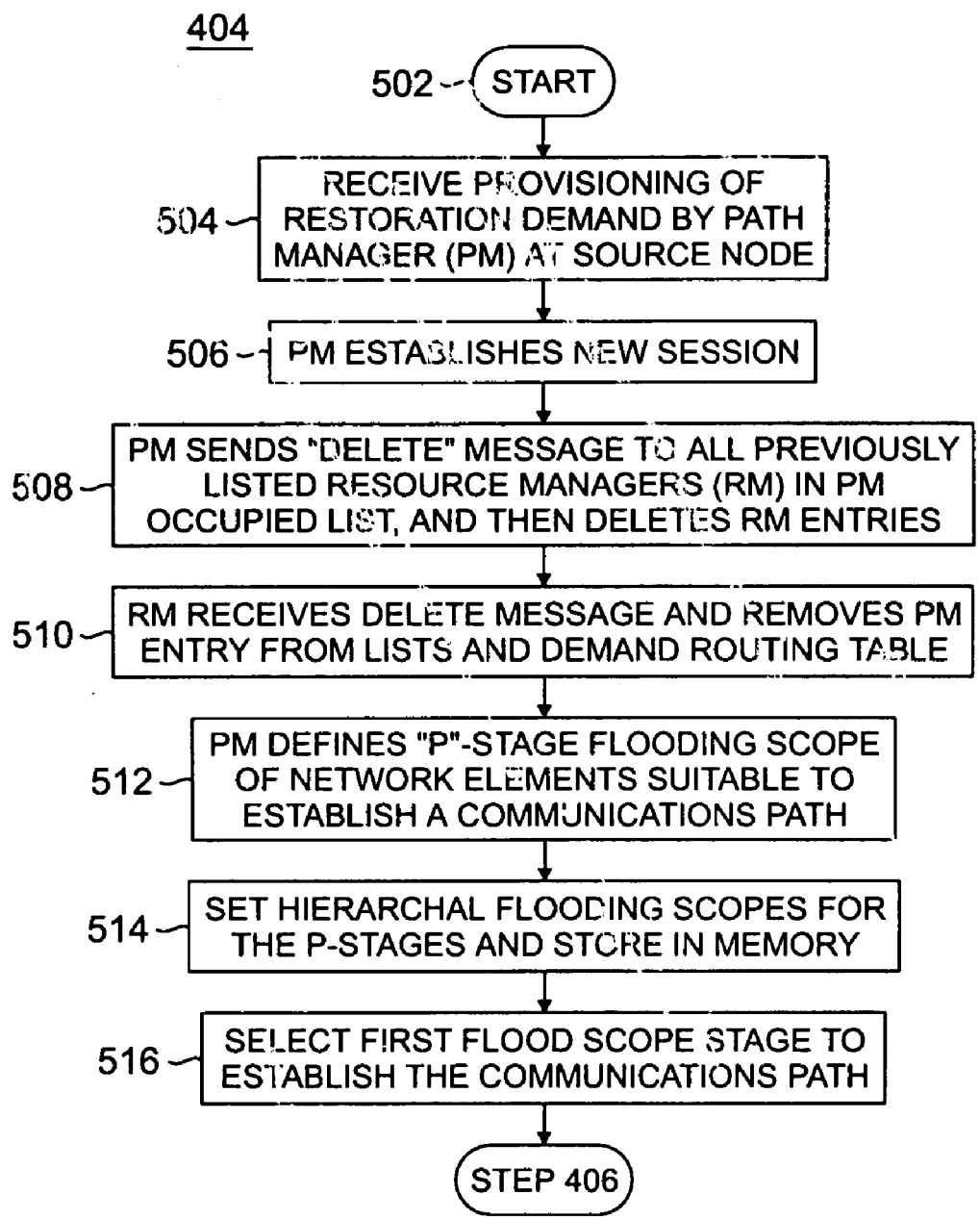
FIG. 5 depicts a flowchart of a method for defining a group of network elements suitable for the communications path for the method of FIG. 4.

FIG. 5 depicts a flowchart of a method for defining a group of network elements suitable for the communications path for the method 400 of FIG. 4. Method 404 of FIGS. 4 and 5 provides the interactions between one or more path managers 204 of respective source nodes and candidate nodes that may establish a through-path 120 to one or more destination nodes. In particular, a network 100 may comprise multiple source nodes, which allocate resources within the network to send communications to various destination nodes. As will be discussed in further detail below, multiple path managers 204 may contemporaneously attempt to allocate the same resources, which may cause a conflict to arise at a particular resource.

The method 404 starts at step 502 where communications between a source node and destination node is sought by, for example, a person utilizing an optical network 100. The communication may be a provisioning request, such as a request for data, to send data, or any other exchange of information. Alternately, the communication may be a restoration request to provide a backup path between the source and destination nodes in the event of a failure event along the current established through-path.

At step 504, the path manager 204 remains in an idle state awaits a provisioning or restoration request. Once a provisioning or restoration request is received by the PM 204, the method 500 proceeds to step 506.

At step 506, the PM 204 establishes a new session having a unique identification (ID) value for the particular provisioning or restoration request, and the PM 204 will attempt to allocate the necessary resources to provide a through-path 120 between the source and destination nodes. At step 508, a "delete" message is sent to all resource managers 206 presently entered in the PM's occupied list 334.

At step 510, each RM in the occupied list of the PM 204 receives the delete message. Each RM 206 removes the PM corresponding to the delete message from any of the above-mentioned RM lists (e.g., wait list 332, occupied list 334, booked list 336, and the like). For example, if a first PM6 was entered in the RM's booked list 336, then the RM deletes the PM6 entry from the booked list 336. In addition, at step 510, the subject PM (e.g., PM6) is removed from the demand routing table of the RM, which tracks the routes to particular network destinations. The method 404 then proceeds to step 512.

At step 512, the PM 204 defines the flooding scope of RM's 206, which are candidates to establish a communications through-path 120. In particular, the PM is provided with a list of RM's in the network 100, of which at least a portion of the RM's 206 are selected as part of one or more flooding scope stage (P-stages). It is noted that a single stage (P=1) may be defined. However, multiple stages ("P" stages) are typically defined, where each stage has at least one different RM 206 included therein.

At step 514, the stages P are assigned into a hierarchal ordered. Typically, the first or lower tiered stages have flooding scopes comprising less resources (nodes) than the higher tiered stages. That is, the higher the stages progress, the greater number of resources are included.

For example, a first stage may include a set of RMs, while a second stage may include all of the RMs of the first stage plus at least one additional RMs that is not included in the first stage. Alternately, an exemplary third stage may include completely different RMs from both the first and second stages, or include some or all of the RMs from either first or second stages.

A PM can define scope on demand upon receiving request, as described above, as well as being predetermined at the time the PM is instantiated. In either case, scopes can be determined in various ways. For example, an area scope may be determined by listing all the links between any nodes with a distance less than a particular number from both of source and destination. A scope containing one or more explicit paths may also be determined by using various routing algorithms.

Once the flooding scope stages are defined and assigned into a hierarchal order in steps 512 and 514, the flooding scope stages are stored in the flood list 312 of the PM. That is, the identification of the RM's 206 in each flooding scope stage are entered in the flood list 312.

At step 516, a first stage is selected. The algorithm is designed to select the earliest stage the through path becomes available. Stages are typically ordered in such a way to allow the earlier stages to have a greater number of favorable path choices. QoS issues, such as path length, are considered when more than one path becomes available within the current working stage.

Additionally, one particular stage may be preferred over another stage to allocate the least amount of resources as possible. That is, the stage selected is the stage having the least amount of RM's included in the stage, thereby freeing up the remaining resources for allocation by others. The method 404 then proceeds to step 406 of FIG. 4.

Figure 6:
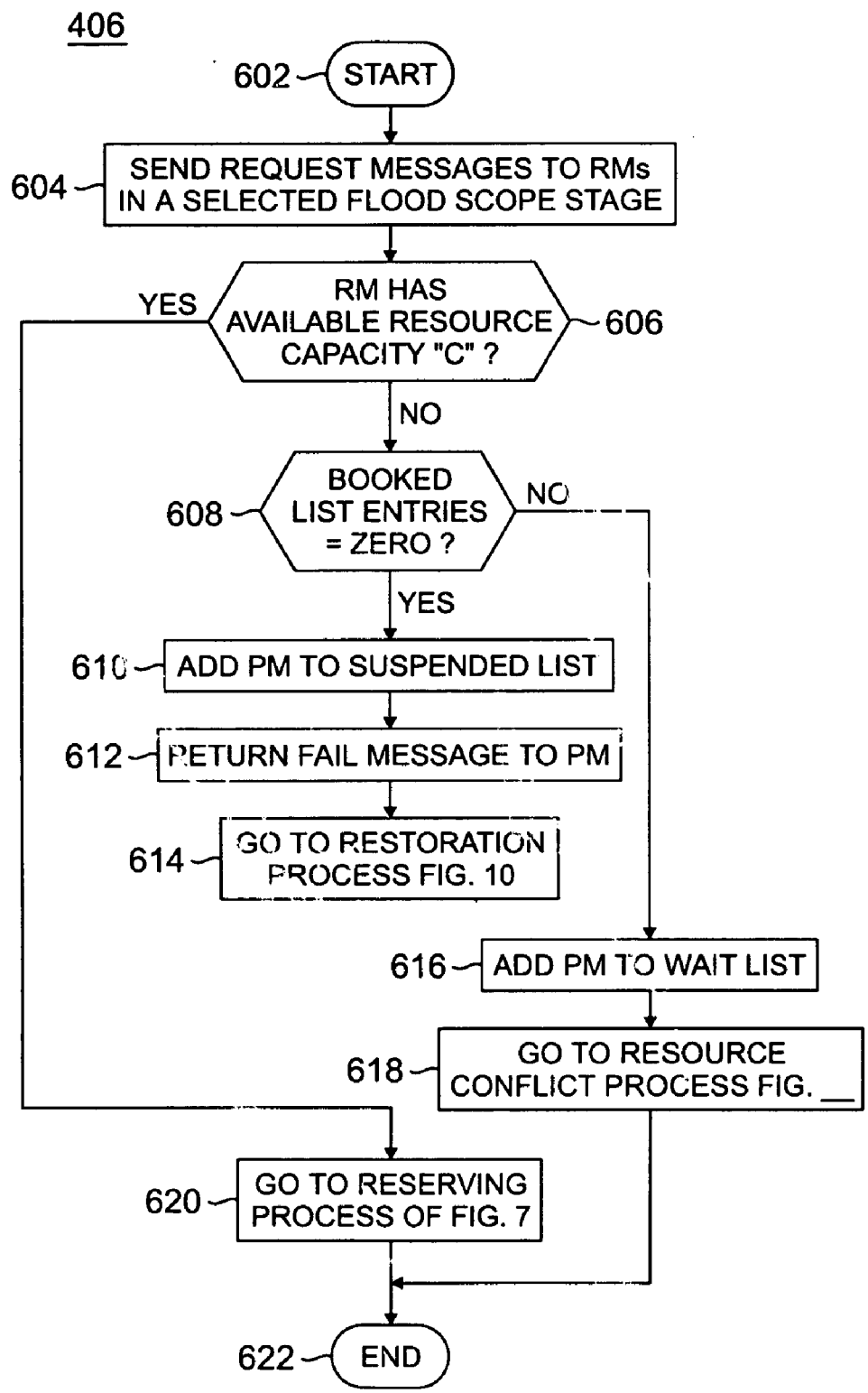
FIG. 6 depicts a flowchart depicting a method for determining available resources for the method of FIG. 4.

FIG. 6 depicts a flowchart of a method 406 for determining available resources for the method 400 of FIG. 4. The method 406 starts at step 602 and proceeds to step 604, where the PM 204 at the source node sends a request message to each of the RMs in the flooding scope stage selected in step 516 of FIG. 5.

At step 604, the RM at each node determines whether the node has available resources to transfer information to another node 102. Available capacity is determined by checking the total number of PM's entered in the occupied list 334 and booked list 332 of the RM 206. If at step 608, the entries in the booked list 336 equals zero, while the entries in the occupied list 334 exceeds the capacity value "C", then all the wavelength channels 208 (see FIG. 2) are currently carrying information (i.e., occupied list entries >=C). That is, the OXC 202 does not have sufficient resources (i.e., bandwidth) to allocate an additional session initiated by the subject PM 204. Accordingly, the subject RM is presently being allocated by other PM's of other source nodes, and is unavailable for current use. At step 610, the PM is added to the RM's suspended list 338, and at step 612, a "fail" message is returned to the PM 204. The method 406 then proceeds to step 614, which is a restoration process described below in further detail with regard to FIG. 10.

If at step 608 a positive integer value is entered in the booked list 334 of the RM 206 (i.e., booked list entries>zero), then the method 406 proceeds to step 616. It is important to note that in step 706, the resource capacity is still considered to have been exceeded, since the number of entries in the occupied and booked lists 332 and 334 are equal to the capacity C of the node (occupied list+booked list entries=C). At step 616, the PM 204 is added to the wait list 332 of the RM 206. The method 406 then proceeds to step 416, which is a process to resolve a conflict at a resource, as described below in further detail with regard to FIG. 12. The method 406 then proceeds to step 622, where the method 406 ends.

Conversely, if at step 606, the RM 206 determines that the number of entries in the occupied list 332 does not equal or exceed capacity, then the method 406 proceeds to step 620. At step 620, the RM 206 has determined that the number of entries in the occupied list 334 plus the booked list 336 of the RM is less than the resource capacity (occupied list+ booked list entries<C). Accordingly, at step 620, the method 406 proceeds to the reserving process described in FIG. 7, and the method 406 ends at step 622.

Figure 7:
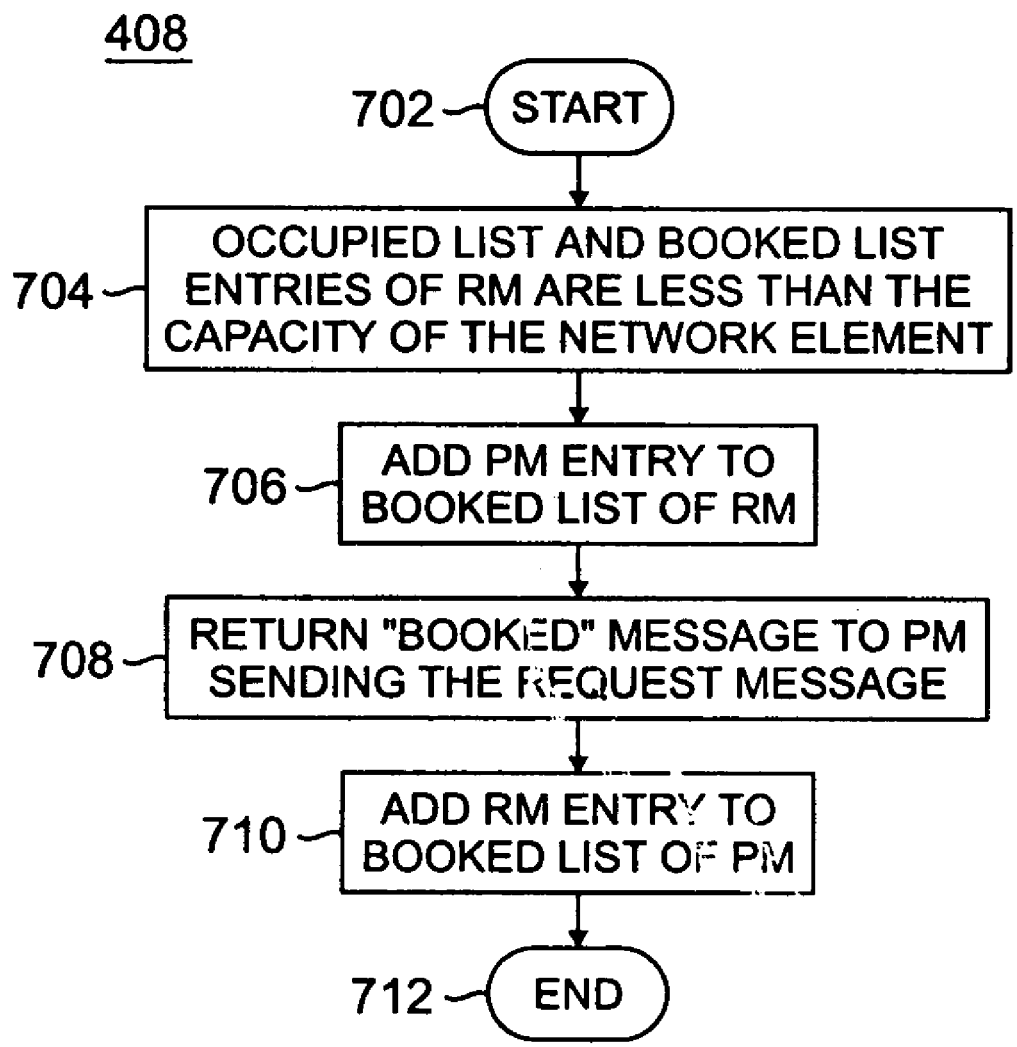
FIG. 7 depicts a flowchart of a method for reserving the available resources suitable to establish the communications path for the method of FIG. 4.

FIG. 7 depicts a flowchart of a method 408 for reserving the available resources suitable to establish the communications path for the method 400 of FIG. 4. The method 408 starts at step 702, and proceeds to step 704, where it was determined (in step 606 of FIG. 6) that the RM has available resource capacity. As such, the combined entries in the occupied list 334 and booked list 336 of the RM 206 are less than the overall capacity of the network element.

At step 706, the PM is added into the booked list 336 of the RM, and at step 708, a "booked" message is returned by the RM to the PM. At step 710, the RM is added into the booked list 314 of the PM 204, and the method 408 proceeds to step 712, where the method 408 ends.

Figure 8A:
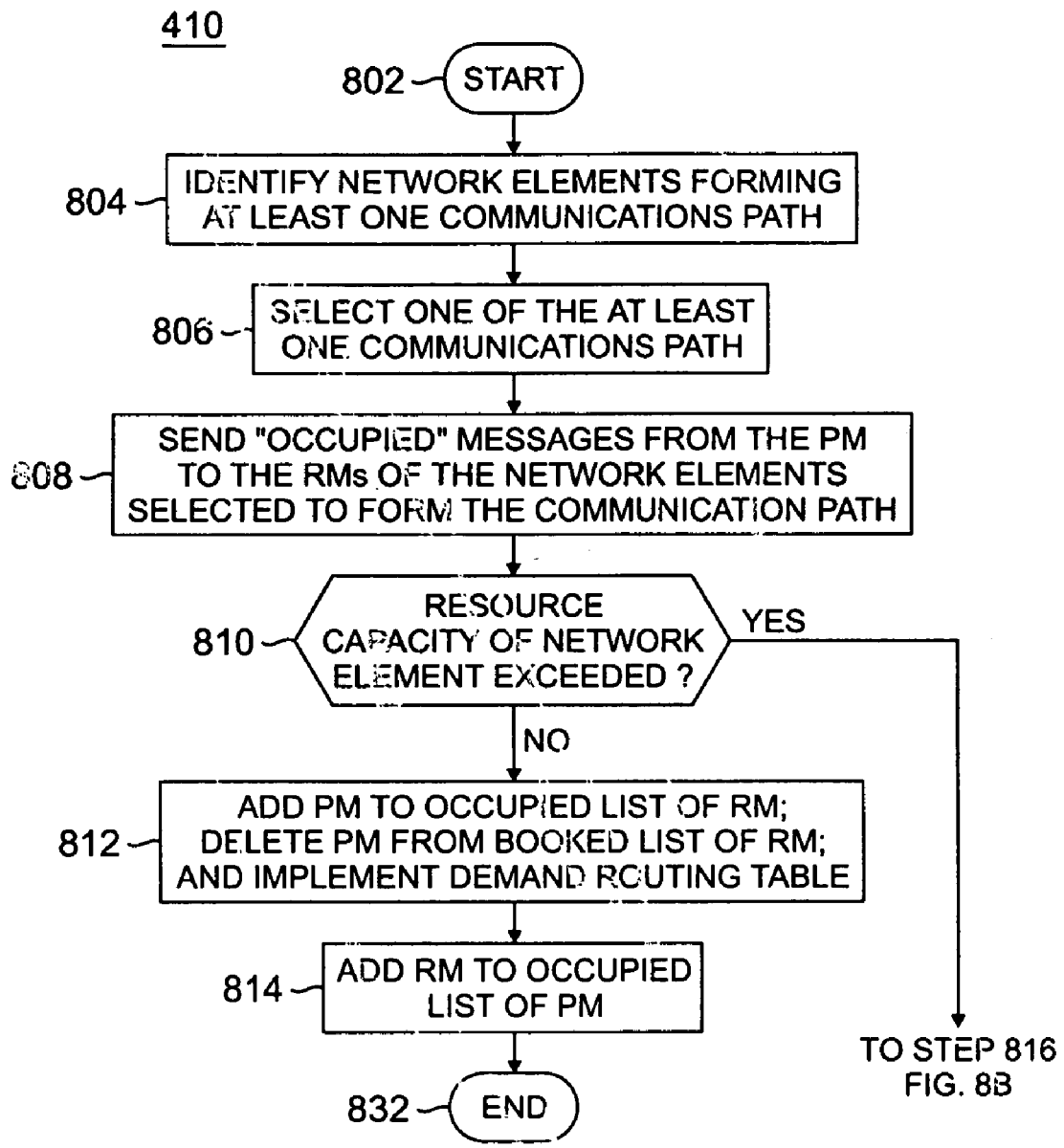
FIGS. 8A and 8B collectively depict a flowchart of a method for selecting the reserved resources suitable to establish the communications path for the method of FIG. 4.
Figure 8B:
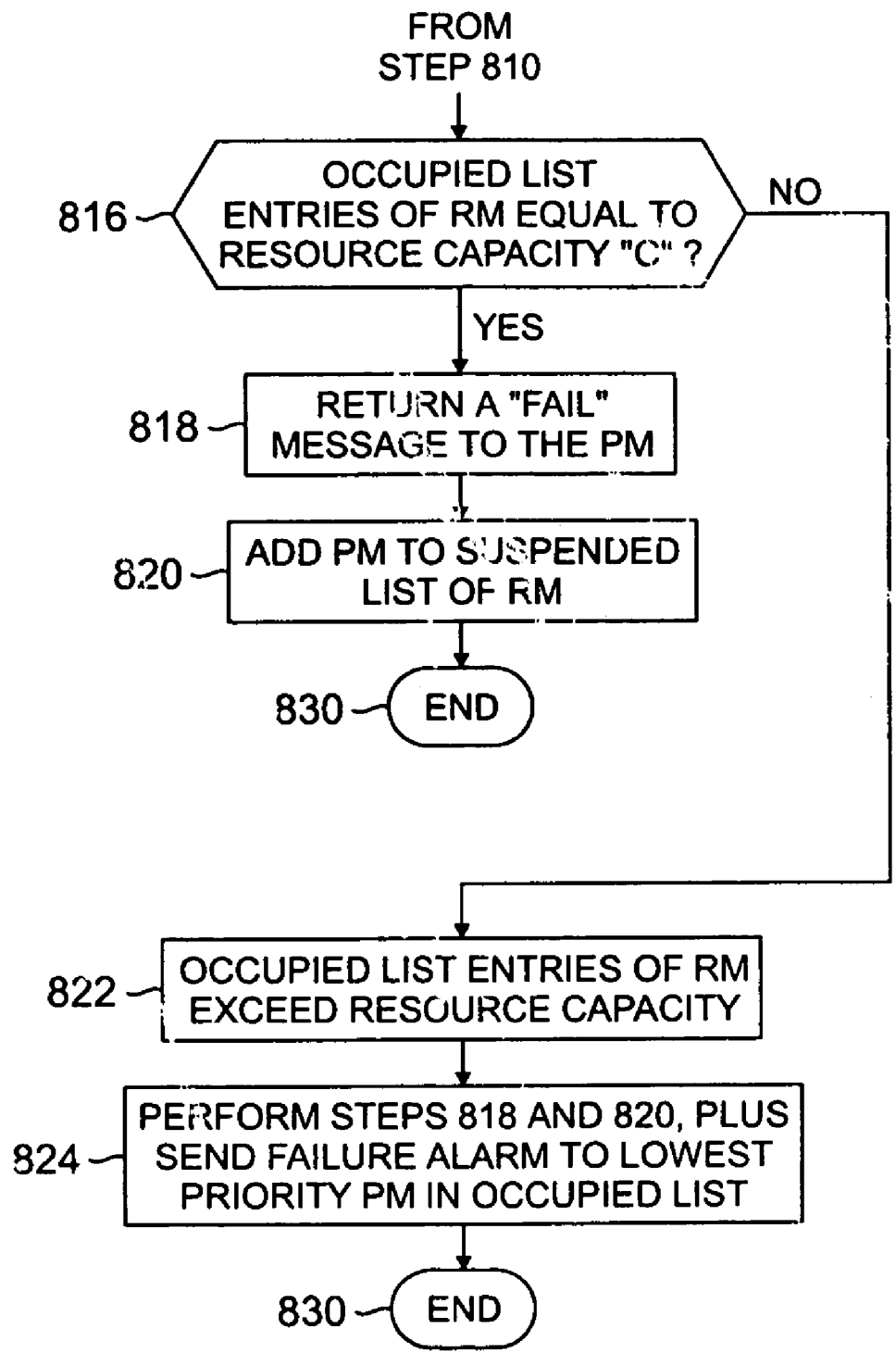

FIGS. 8A and 8B collectively depict a flowchart of a method 410 for selecting the reserved resources suitable to establish the communications path for the method 400 of FIG. 4. The method 410 starts at step 802 and proceeds to step 804, where the path manager 204 reviews the RM entries in the booked list 314 and identifies those network elements (nodes) forming at least one communications path 120.

At step 806, the PM 204 selects one of the at least one communications path 120. The PM is provided with various criteria for selecting a particular communications path when more than one possible communication paths may be implemented. Typically, the network elements 102 selected by the PM to form the communications path are those that utilize the least amount of resources and provide the best quality of service. Additionally, one communications path may be selected over another communications path due to load balancing considerations. For example, if there are more than one paths available within a certain range of length, a communications path having less packed links are preferred.

At step 808, the PM 204 sends an "occupied" message to those RMs selected to form the communications path 120. The method 410 then proceeds to step 810, where a query is made to determine whether the capacity of the network element 102 has been exceeded. If the query at step 810 is negatively answered, then the method 410 proceeds to step 812. At step 812, the PM is added to the occupied list 334 of the RM, the PM is deleted from the booked list 336 of the RM 206, and the demand routing table is implemented.

The demand routing table (not shown) is used by an external system, such as a node controller (not shown), to actually give commands to switches. The node controller needs to know the routing of the relevant path before switching. As such, the signaling system provides the routing table information to the controller as soon as the information is available. In one embodiment, the routing table is written on the shared area of memory 330, which is accessible by the node controller.

At step 814, the RM 206 is added to the occupied list 318 of the PM 204, and the method 410 proceeds to step 830, where the method 410 ends.

If the query at step 810 is affirmatively answered, then the method 410 proceeds to step 816. At step 816, a query is made as to whether the entries of the occupied list 334 of the RM 206 equal the resource capacity. If the query at step 816 is affirmatively answered, then the method 410 proceeds to step 818. At step 818, the RM returns a "fail" message to the PM 204 and the PM is added to the suspended list 338 of the RM. The method 410 then proceeds to step 830, where the method 410 ends.

If the query at step 816 is negatively answered, then the method 410 proceeds to step 822. At step 822, the entries in the occupied list 334 of the RM exceed the resource capacity. At step 824, steps 818 and 820 are performed, and a failure alarm is sent to the lowest priority PM in the occupied list 334 of the RM 206. The method 410 then proceeds to step 830, where the method 410 ends.

Figure 9:
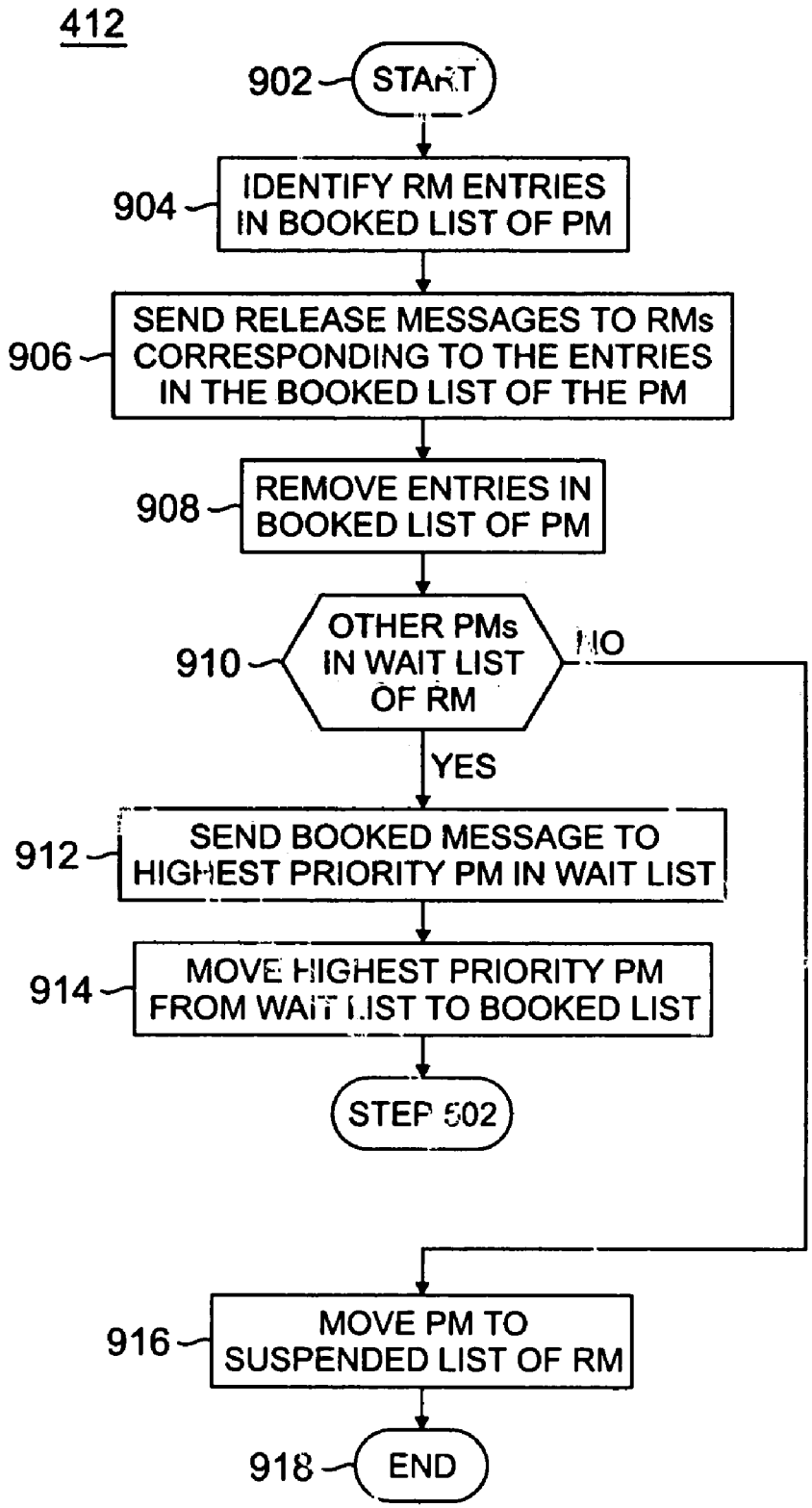
FIG. 9 depicts a flowchart of a method for releasing reserved resources for the method of FIG. 4.

FIG. 9 depicts a flowchart of a method 412 for releasing reserved resources for the method 400 of FIG. 4. Method 412 starts at step 902 and proceeds to step 904, where the PM identifies the RM entries in the booked list 314 of the PM 204. At step 906, the PM sends release messages to each RM identified in the booked list 314 of the PM 204. At step 908, the PM 204 removes the RM entries in the booked list 314 of the PM 204. The method then proceeds to step 910.

At step 910, a query is made to determine whether other PMs are listed in the wait list 332 of the RM. If the query of step 910 is affirmatively answered, then at step 912, the PM having the highest priority is sent a "booked" message by the RM. At step 914, the PM having the highest priority is moved from the wait list 332 to the booked list 336 of the RM, and the method 412 proceeds to step 502 as discussed above with regard to FIG. 5.

If the query of step 910 is negatively answered, then at step 916, the PM is moved from the booked list 336 to the suspended list 338 of the RM 206. The method 412 then proceeds to step 918, where the method 412 ends.

Referring to FIG. 4, once the reserved resources have been selected to establish the communications path in step 410 and the remaining reserved resources have been released in step 412, the communications path 120 is set up to provide communications from the source node to the destination node, via the selected resources. The communication session ends once the communication path 120 between the source and destination nodes are no longer required to exchange information.

As discussed above with regard to step 614 of FIG. 6, a restoration process may be utilized where a RM 206 returns a "fail" message back to the PM. The fail message is sent by a RM at a resource because of a particular problem at such resource, which results in the unavailability of that resource. For example, the fail message by the RM may signify that the resource (e.g., the capacity at a particular fiber optic) is full. Alternately, the fail message by the RM 206 may signify that an unexpected failure has occurred, such that the resource is not currently operational. For example, the wavelength path (i.e., fiber optic) has been severed.

Otherwise, if a request is sent by a PM 204 to a RM 206 at a resource, and no response is provided back to the PM 204 (i.e., times out), then silence (no response) of the RM is considered a failure message. In this latter case, a severed line that isolates the node may be considered an unexpected failure resulting in a failure message being implicitly received by the PM 204. In any case, once a fail message is received (implicitly or explicitly) by the PM 204 the restoration process method 614 is implemented.

Figure 10:
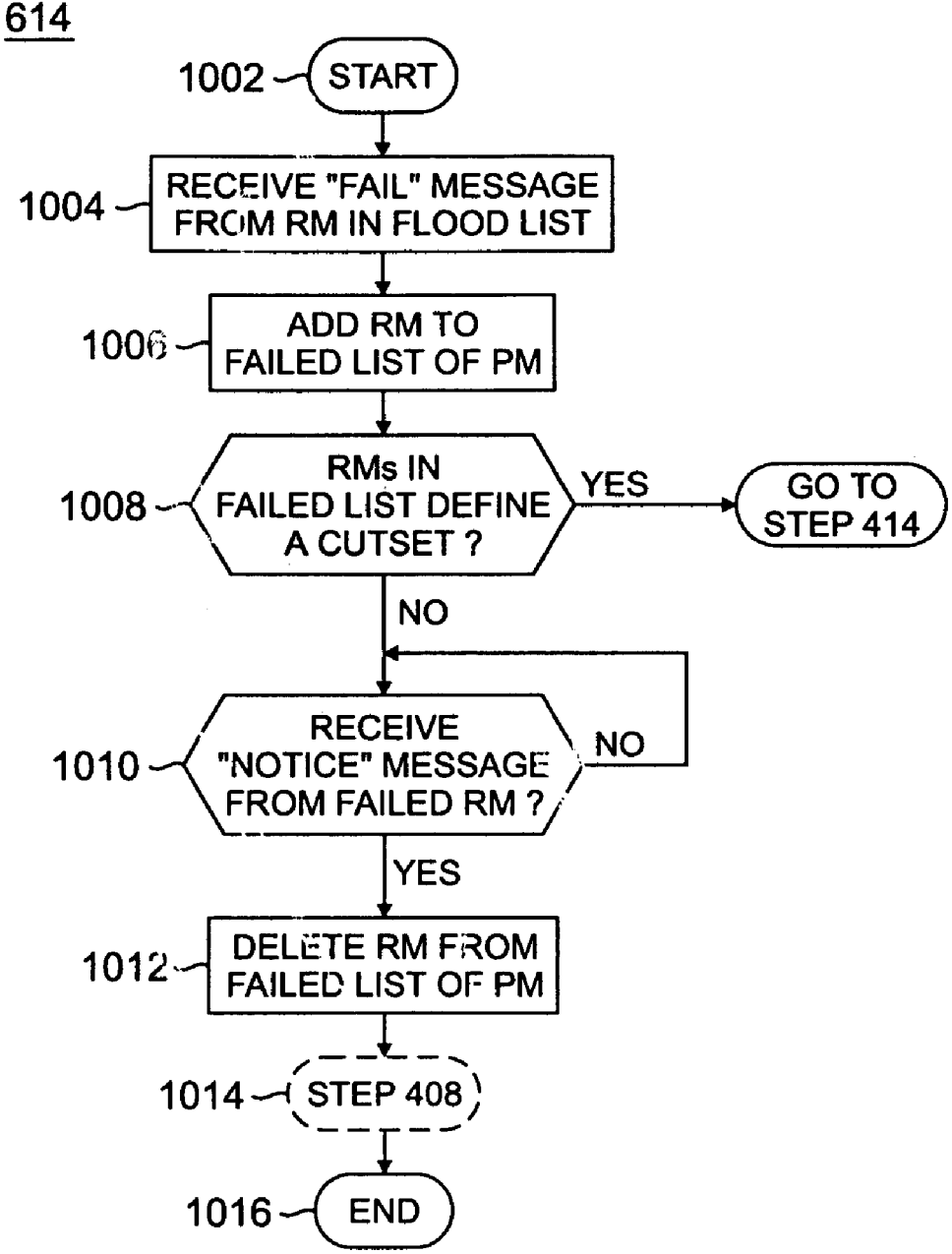
FIG. 10 depicts a flowchart for providing a first restoration process for the method of FIG. 4.

FIG. 10 depicts a flowchart for providing a first restoration process 614 for the method 406 of FIG. 4. Method 614 starts at step 1002 and proceeds to step 1004, where the PM 204 receives a fail message from one or more of the RM's 206 in the currently used flooding scope stage defined in the flood list 312 of the PM 204. The method 614 then proceeds to step 1006, where the RM is added to the failed list 316 of the PM.

At step 1008, the PM reviews the failed list 316 to determine if a cut-set has been defined. For purposes of clarity, a set of links whose removal (e.g., failure) results in separation of source and destination nodes. Referring to FIG. 1, if for example, source node $102_7$ lost all connectivity to nodes $102_8$ and $102_{12}$ (i.e., $link_{7-8}$ and $link_{7-12}$), then source node $102_7$ is isolated (cutoff) from the destination node $102_{18}$.

If a cut-set is defined at step 1008, then the method 614 proceeds to step 414 of FIG. 4, which is discussed in further detail below with regard to FIG. 11. If a cut-set is not defined at step 1008, then the method 614 proceeds to step 1010. At step 1010, a query is made whether the PM 204 has received a "notice" message from the failed RM 206. If a notice message is not received at step 1010, then the failed RM remains listed in the failed list 316 of the PM until such notice message is received.

If a notice message is not received at step 1010, then the method 614 proceeds to step 1012, where the RM entry is removed from the failed list 316 of the PM 204. The previously failed resource is now considered available for being allocated to provide a communication path 120, as required. As such, the method 614 may optionally proceed to step 1014, where the method 614 proceeds to step 408 of FIG. 4. Alternately, the method 416 proceeds to step 1016 where the method 416 ends.

Figure 11:
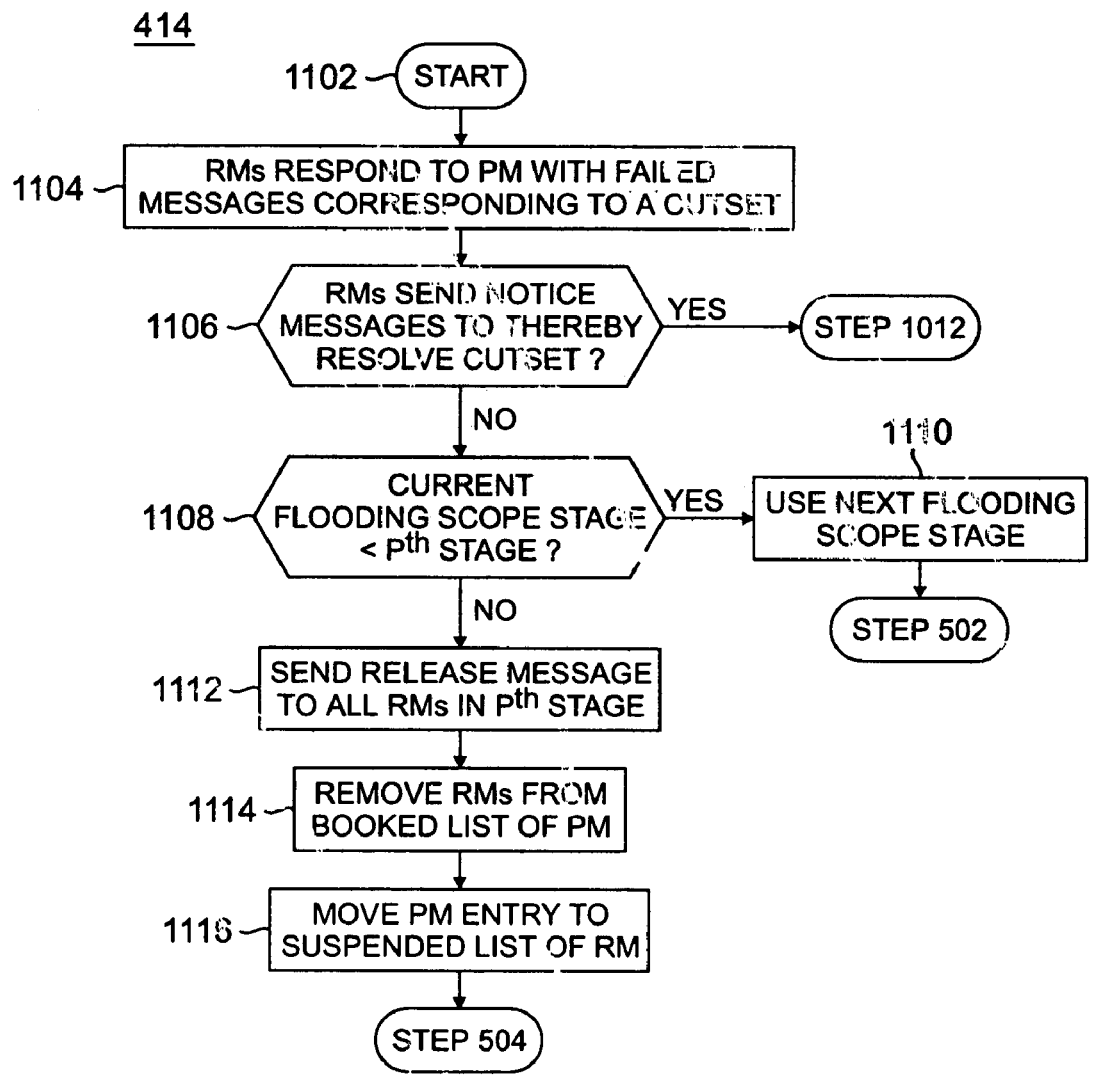
FIG. 11 depicts a flowchart for providing a second restoration process for the method of FIG. 4.

FIG. 11 depicts a flowchart for providing a second restoration process 414 for the method 400 of FIG. 4. The method 414 starts at step 1102 and proceeds to step 1104, where the RMs 206 respond to the PM 204 with failed messages corresponding to a cutset. At step 1106, the PM determines whether the cutset has been resolved. Specifically, the PM checks the RMs sending notice messages to determine whether at least one of the now operational resource is capable of defining a communications through-path 120 between the source and destination nodes.

If at step 1106, the cutset is resolved, then the method 414 proceeds to step 1012 of FIG. 10, where the communications path is attempted again from the current flooding scope stage. If at step 1106, the cutset is not resolved, then the method 414 proceeds to step 1108. At step 1108, a second query is made to determine the hierarchal status of the currently used stage.

If at step 1108, the currently used stage is less than the highest flooding scope stage ($P^{th}$ stage), then at step 1110, the next hierarchal stage is selected and used to establish a communications path 120. The method 414 then proceeds to step 502, where a new session is established as discussed above with regard to FIG. 5. Thus, the method expands the flooding scope to allocate additional resources in the event of an unexpected failure resulting in a cutset occurring.

If at step 1108, the currently used stage is the highest flooding scope stage ($P^{th}$ stage), then at step 1112, the PM sends a release message to all of the RMs in the $P^{th}$ flooding scope stage. At step 1114, the PM 204 removes the RMs from the booked list 314 of the PM 204, and at step 1116, each RM in the $P^{th}$ stage of the flooding scope move the PM entry to the suspended list 338 of the RM. Accordingly, the network 100 is currently incapable of providing a communications path between the source node and destination node until some external corrective action is provided to the network 100. Once at least a portion of the network is operable, the method 414 proceeds to step 504, as discussed above with regard to FIG. 5.

Thus, steps 1002 through 1016 of method 614 provide a technique for addressing unexpected failures by removing the failed resources from the current flooding scope stage, until such resources are restored. Furthermore, where an alternate communications through-path 120 can no longer be provided, method 414 permits the flooding scope to be expanded to provide additional resources for allocation. Alternately, if a cut-set is resolved in a timely manner, then a new session may be initiated using the resources of the current flooding scope.

The above-mentioned embodiment shown in FIGS. 4-11, illustrate one technique for establishing a communications through-path 120 between a source and destination node. In particular, where the resources at various nodes are available (i.e., not at full capacity or a conflict for use) within a stage of the flooding scope, then the communications path 120 is readily established.

However, multiple source nodes each having a PM 204 may share the network resources. The technique of multicasting request messages by each PM may result in a conflict at one or more of the resources. Specifically, a conflict situation may arise at a particular resource between multiple path managers 204. The present embodiment resolves allocation conflicts by prioritizing the path managers 204 at the various nodes. Each resource requests can be made unique by indexing the resource request with a source ID, destination ID, and demand ID for purposes of performing tie-breaking functions. The resource request may also be intentionally differentiated, e.g., for different class of service, by introducing another ID, such as a service ID.

FIG. 12 depicts a flow diagram illustrating resource conflict resolution between a plurality of network managers. In particular, the resource conflict occurs in instances where a resource (e.g., node) is included in the flooding scopes of at least two independent path managers respectively of at least two source nodes. A conflict arises when at least two path managers contemporaneously attempt to allocate a single resource (e.g., fiber optic wavelength path 108). FIG. 12 illustrates a process for resolving a conflict situation as between two path managers that share two common resources in each of their respective flooding scopes.

Referring to FIG. 12, two exemplary path managers $204_1$ and $204_2$ are shown attempting two allocate two exemplary nodes controlled by resource managers RM1 $206_1$ and RM2 $206_2$ to establish two independent communication paths. Both PMs $204_1$ and $204_2$ are attempting to establish their respective communication paths 120 contemporaneously. It is noted that the first path manager PM1 $204_1$ has a higher priority over the second path manager PM2 $204_2$.

Prior to attempting to allocate the resources, both PM1 and $204_1$ and PM2 $204_2$ are in an idle state. Once they receive a demand to provide a communications path (step 504 of FIG. 5) both PM1 and $204_1$ and PM2 $204_2$ switch to an attempt (i.e., try) state.

At steps $604_{1A}$ and $604_{1B}$, PM1 $204_1$ contemporaneously sends request messages to RM1 $206_1$ and RM2 $206_2$. Similarly, at steps $604_{2A}$ and $604_{2B}$, PM2 $204_2$ contemporaneously sends request messages to RM1 $206_1$ and RM2 $206_2$. It is noted that steps $604_{1A}$, $604_{1B}$, $604_{2A}$, and $604_{2B}$ are all performed contemporaneously. It is further noted that the subscripts 1 and 2 respectively refer to the PM or RM performing some function. For example, step $604_{2A}$ refers to PM2 and RM2, as opposed to PM1 and RM1.

At step $708_1$, the RM1 $206_1$ returns a booked message to PM1 $204_1$. PM1 is entered into the booked list 336 of RM1, while PM2 is entered into the wait list 332 of RM1. Likewise, at step $708_2$, the RM2 $206_2$ returns a booked message to PM2 $204_2$. PM2 is entered into the booked list 336 of RM2, while PM1 is entered into the wait list 332 of RM2. Accordingly, RM2 is unavailable to PM1, since RM2 has already returned a booked message to PM2. Further, RM1 is unavailable to PM2, since RM1 has already returned a booked message to PM1.

At step 1204, RM2 checks the wait list 332 of RM2 and compares the priority of PM1 to the priority of the PM2 in the booked list 336. It is noted that the same operation is performed by RM1. That is, the PM entries in the wait list are compared to the entry in the booked list to ensure that the highest priority PM will be allocated the resource. In this instance, PM1 illustratively has higher priority than PM2.

At step 1204, RM2 sends an "inquire" message to PM2. An inquire message is used by a PM to check status and determine whether the PM may revoke the reservation (i.e., booked state) at the RM. A revocation of a reservation (booked message) may occur if the PM has not already sent an "occupied" or "release" message to the RM.

In the example shown in FIG. 12, PM2 has not sent an occupied or release message to RM2. As such, at step 1206, PM2 sends a revoke message to RM2. RM2 then moves PM2 from the booked list 336 to the wait list 332 of RM2. At step 1208, RM2 sends a booked message to the highest priority PM in its wait list 332. In this instance, RM2 sends a booked message to PM1.

Once PM1 has enough resources allocated to establish a communications path 120, the state of PM1 changes to a successful state. During the success state, at step $808_1$, PM1 sends an "occupy" message to RM1. Likewise, at step $808_2$, PM1 sends an "occupy" message to RM2. PM1 then enters RM1 and RM2 into the occupied list 318 of PM1. Similarly, both RM1 and RM2 enter PM1 into their respective occupied lists 334.

At step $818_1$ and $818_2$, RM1 and RM2 send "fail" messages to PM2. PM2 enters a fail state and then moves the PMs in the wait list 332 to the suspend list 338 of PM2. At step 906, PM2 sends a "release" message to all of the RMs in the current flood list 312. However, the release message is ignored by the RMs, since RM2 is currently entered in the occupied list 318 and allocated by PM1.

It is also noted that a "deadlock" situation may arise, where a process waits for a reply that is never returned. Deadlock happens when two process wait for each other in such a way that neither of them can do anything until receiving each other's reply.

For example, in FIG. 12, RM2 queues the request from PM1, and RM1 queues the request from PM2. If there is no priority assigned between the PMs, then RM2 won't send an inquire message to PM2, and a deadlock situation results, since PM1 has to wait for the release of RM2 by PM2, and PM2 has to wait for release of RM1 by PM1. As such, prioritizing the path managers invokes the inquiry message to the lower priority path manager, thereby preventing a deadlock situation from arising.

The present invention provides a sophisticated signaling mechanism for networks such as optical networks. One advantage of the inventive embodiment described herein is that the path manager 204 multicasts the request for resources to every resource manager required to reserve a communications path. The multicasting technique allows for a faster signaling procedure than the conventional signaling protocols like RSVP or LDP, which forwards the request messages hop-by-hop.

Additionally, greater flexibility is provided during deadlock situations. That is, in the presence of collisions among requests, the multistage flooding scope flexibly allows the greater allocation of available bandwidth. As such, the probability of success, that is forming a communications path upon demand, is greater than the conventional signaling protocols (RSVP or LDP).

Moreover, the flexibility of the flood signaling architecture allows for the custom tailoring of the path managers 204 and resource managers 206 to accommodate specific requirements of the network 100. For example, broadening the scope of flooding provides greater probability of success, while setting different times for various RMs 206 to respond to requests affords greater accuracy to the priority PMs, with relatively little impact on overall signal completion.

Further, where an unexpected failure occurs in the network, the flood signaling architecture utilizes the multistage flooding scope to overcome the failure by attempting to allocate all possible resources within the flooding scope stages. That is, the flood signaling architecture does not stop in attempting to allocate resources unless there is no probability of success.

Although various embodiments that incorporate the teachings of the present invention have been shown and described in detail herein, those skilled in the art can readily devise many other varied embodiments that still incorporate these teachings.

What is claimed is:

1. A method for establishing a communications path between a source network element (NE) and a destination NE, comprising:
   (a) defining flooding scope stages including respective groups of NEs for use in establishing said communications path, each flooding scope stage including NEs providing at least one potential path between said source NE and said destination NE, said flooding scope stages comprising a first group of NEs and a second group of NEs having at least one NE not associated with the first group of NEs;
   (b) contemporaneously determining available resources within each of the NEs of said first group of NEs;
   (c) contemporaneously reserving those available resources appropriate to establish said communications path;
   (d) selecting reserved resources sufficient to establish said communications path;
   (e) releasing those reserved resources not selected; and
   (f) in the absence of available resources sufficient to establish said communications path, repeating steps (b)-(e) using the second group of NEs.

2. The method of claim 1, wherein the second group of NEs comprises at least a portion of the first group of NEs and at least one additional network element not associated with the first group of NEs.

3. The method of claim 1, wherein:
   (g) in the absence of available resources sufficient to establish the communications path using the second group of NEs, repeating steps (b)-(e) using a third group of NEs suitable for establishing said communications path.

4. The method of claim 1, wherein said defining step (a) comprises defining the flooding scope stages on-demand, upon receiving a request.

5. The method of claim 1, wherein said defining step (a) comprises defining the flooding scope stages at the time a Path Manager (PM) is instantiated, wherein the PM is instantiated on a first NE in the first group of NEs, wherein the first NE is a source of the communications path.

6. The method of claim 1, wherein said defining step (a) comprises defining the flooding scope stages by listing all the links between any nodes with a distance less than a particular number from both of source and destination.

7. The method of claim 1, wherein said defining step (a) comprises defining the flooding scope stages by using various routing algorithms.

8. The method of step 1, wherein said determining step (b) comprises:
sending request messages from a PM at a source node to resource managers (RM) at each network element within the first group of NEs; and
returning response messages from each said RM to said PM.

9. The method of claim 8, wherein said response message comprises a failure message indicating that a particular resource in said first group of NEs is an unavailable resource for establishing said communications path.

10. The method of claim 9, further comprising:
(g) in the absence of available resources sufficient to establish the communications path from the second group of NEs, repeating steps (b)-(e) using a third group of NEs suitable for establishing said communications path;
wherein, prior to implementing step (g), said method further comprises:
restoring an unavailable resource to an available resource in said first group of NEs.

11. The method of claim 10, wherein said restoring step comprises:
sending a notice of resource availability to said PM in said first group of NEs prior to implementing step (g).

12. The method of claim 11, wherein step (g) further comprises:
determining whether said communications path may not be established due to unavailable resources sending said failure messages.

13. The method of claim 8, wherein said response message comprises an inquiry message indicating a conflict for contention of a resource at a network element reserved by at least two PMs.

14. The method of claim 13, further comprising:
resolving said reservation conflict by selecting a PM having a priority level greater than other conflicting PMs.

15. The method of claim 14, further comprising:
in the absence of said resource being previously selected by a lower priority PM, revoking reserved resource allocation to said lower prioritized PMs.

16. The method of claim 15, further comprising:
selecting said reserved resource at said network element by said higher prioritized PM.

17. The method of claim 1, wherein said reserving step (c) comprises:
returning a booked message from each of ones of the NEs in the first group of NEs on which available resources are determined to a source NE to reserve the available resources of the ones of the NEs as the respective reserved resources.

18. The method of claim 17, wherein said selecting step (d) comprises:
determining whether said reserved resources of the ones of the NEs form said communications path between the source and destination nodes.

19. The method of claim 18, wherein said determining step comprises:
selecting optimal reserved resources among said reserved resources of the ones of the NEs to form said communications path.

20. The method of claim 19, wherein said selecting step (d) further comprises:
sending occupied messages to each of the NEs on which the respective optimal reserved resources are selected to form said communications path.

21. The method of claim 1, wherein said releasing step (e) comprises:
sending release messages to those NEs of the first group of NEs for which associated reserved resources are not selected.

* * * * *